Aug. 15, 1939.　　　A. J. FREEMAN　　　2,169,413
APPARATUS FOR APPLYING IDENTIFYING MEANS
Filed Nov. 12, 1937　　　2 Sheets-Sheet 1
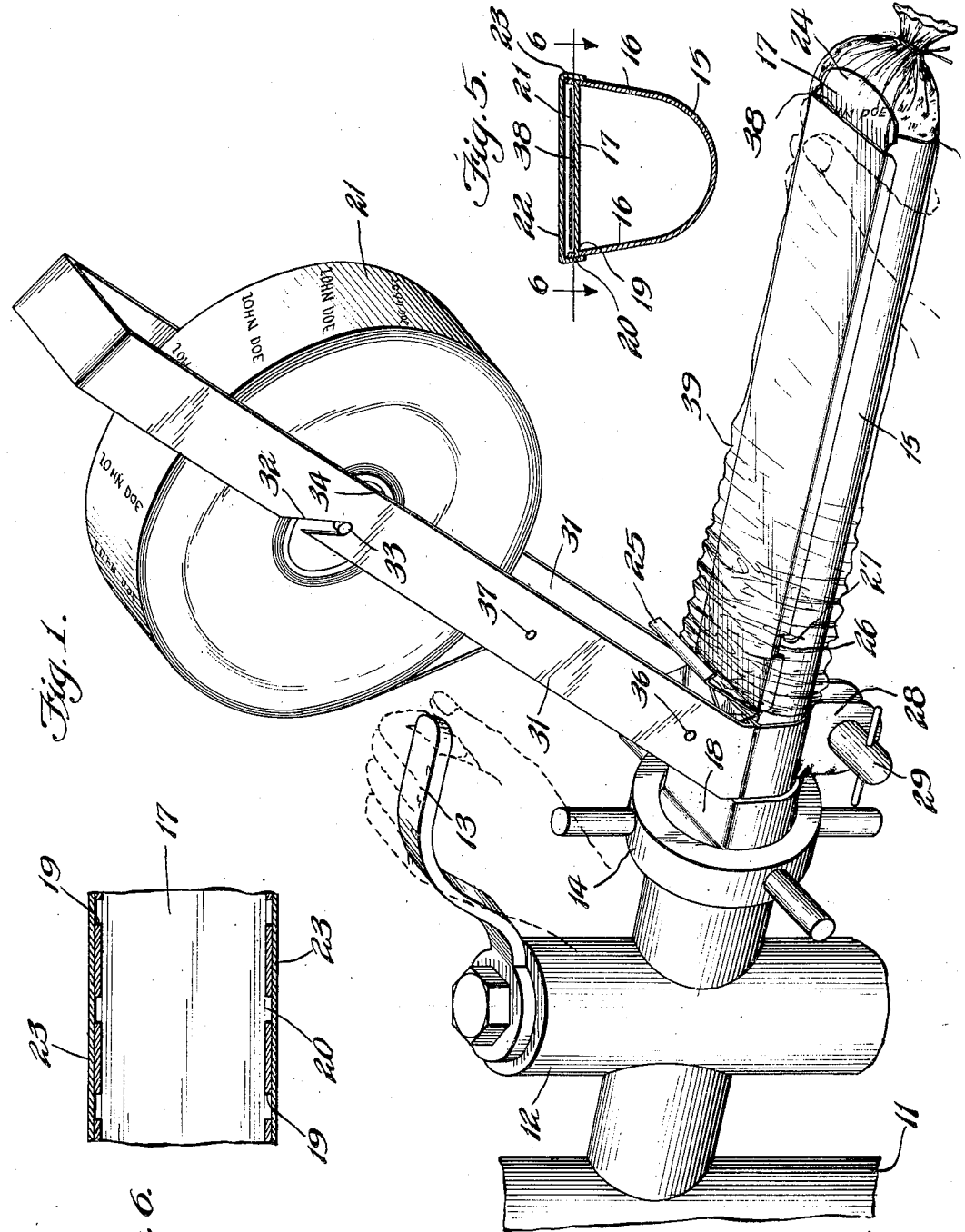

Aug. 15, 1939.   A. J. FREEMAN   2,169,413
APPARATUS FOR APPLYING IDENTIFYING MEANS
Filed Nov. 12, 1937   2 Sheets-Sheet 2
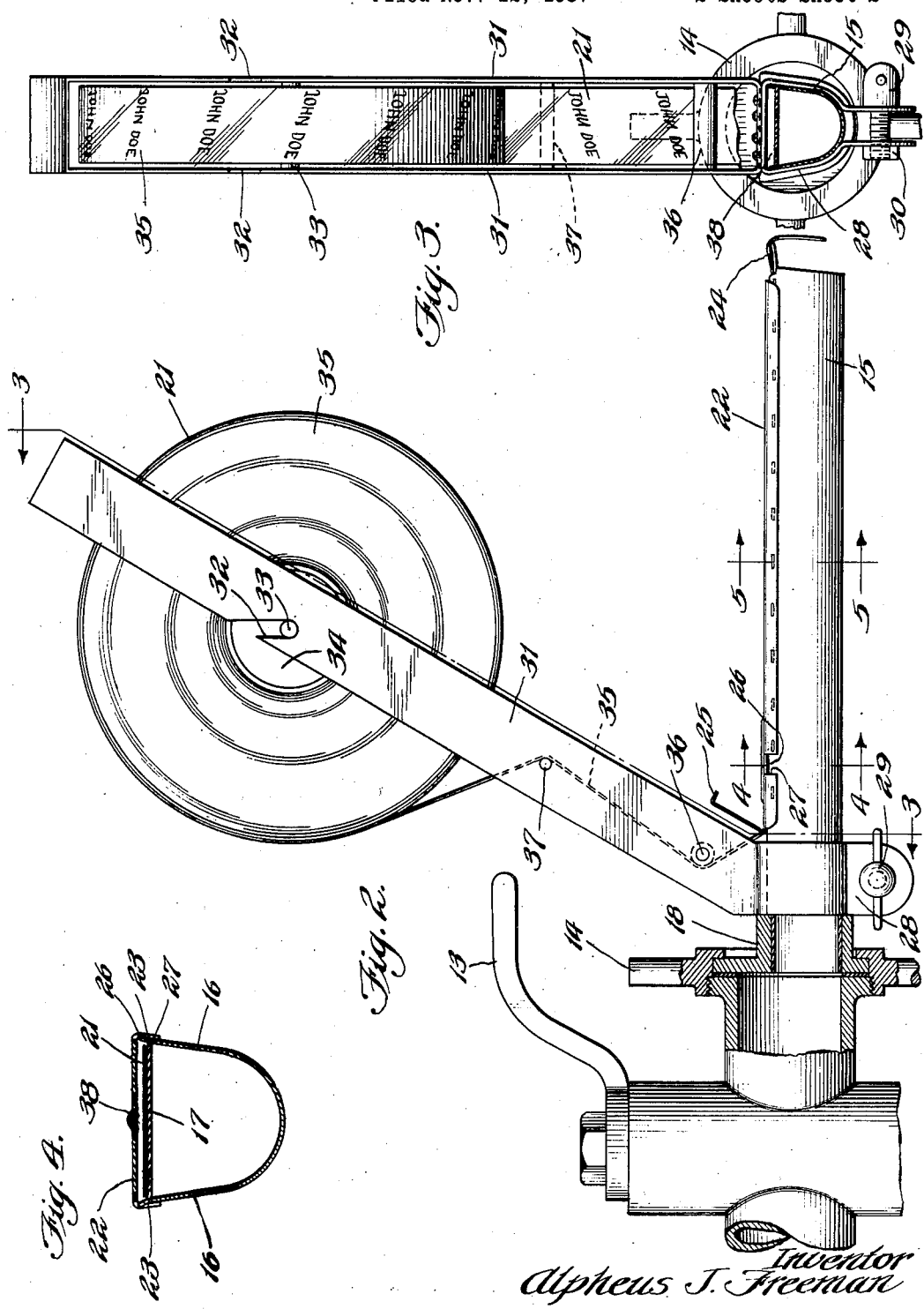
Inventor
Alpheus J. Freeman
By Glenn S. Noble atty.

Patented Aug. 15, 1939

2,169,413

UNITED STATES PATENT OFFICE 2,169,413

APPARATUS FOR APPLYING IDENTIFYING MEANS

Alpheus J. Freeman, Chicago, Ill., assignor to Freeman, Incorporated, Chicago, Ill., a corporation of Illinois Application November 12, 1937, Serial No. 174,150

11 Claims. (Cl. 17—41)

This invention relates to stuffer horns or devices for stuffing or inserting food products or the like in casings, provided with means for simultaneously inserting identifying strips of tape, ribbon, or other suitable material, in the casings during the filling operation. It relates particularly to means for carrying out the process shown in my copending application for Food marking and reinforcing, filed March 4, 1935, Serial No. 9,282. It also relates to devices of the character shown in my copending application for Apparatus for marking food products, filed May 27, 1936, Serial No. 82,041. As shown by such applications, and my Patent No. 1,994,468, March 19, 1935, I have heretofore invented certain methods and apparatus relating to the marking of food products and the present invention is a further development of my apparatus to be used for such purposes.

The objects of the present invention are to provide an improved and simplified apparatus for use in inserting marking strips, tape or the like, in casings or wrappings during the stuffing or filling thereof; to provide an improved stuffer horn with an integrally formed passageway or guideway formed therein for the passage of the identifying tape or ribbon during the stuffing or filling operation; to provide a stuffer horn with a guideway and means for supporting a roll of tape or identifying means to be passed through such guideway, whereby it will not interfere with the operation of the outlet valve; to provide a stuffer with means for supporting a supply of identifying tape in operative relation thereto; and to provide such other novel features and advantages as will appear more fully hereinafter.

In the accompanying drawings illustrating this invention:

Figure 1 is a perspective view of my improved apparatus shown in operating position;

Figure 2 is a side view with parts broken away to show the interior construction;

Figure 3 is a front sectional view taken on the line 3—3 of Figure 2;

Figure 4 is a section taken on the line 4—4 of Figure 2 but shown on an enlarged scale;

Figure 5 is an enlarged sectional view taken on the line 5—5 of Figure 2;

Figure 6 is a sectional view taken on the line 6—6 of Figure 5.

As shown in some of these views, 11 indicates a portion of a stuffing machine having the usual outlet control valve 12 with operating lever 13, and coupling 14 for the stuffer horn. Such stuffer horns as heretofore usually provided are of circular cross section and made simply in the form of nozzles for supporting the casings during the filling operation and directing the material into the same. Instead of such usual form of horn I provide an improved horn such as shown in the accompanying drawings, having operatively associated therewith a guideway for the identification tape and means for supporting the tape to be passed through such guideway. In one particular form of the invention as shown the horn or stuffer 15 is of substantially U-shape in cross section having a semicylindrical bottom portion with diverging sides 16, and a flat top or upper portion 17 which is depressed slightly above the upper edges of the sides 16 as shown in Figure 5. The horn and other parts associated therewith may be made of any suitable material but the horn is preferably made of stainless steel. The inner end of the horn 15 is secured in, or provided with, a flanged coupling member 18 which fits in or engages with the standard or other coupling 14 in order to mount it in operative position. The horn and coupling may be cast integrally but as shown the horn is made of sheet metal with holes 19 along the sides for receiving self rivets, or projections 20 along the edges of the top 17 which are riveted to hold the top in position and to form a closed tube. The extension of the sides above the top 17 provides a guideway or passageway for the identifying strip or ribbon 21. This passageway has a cover 22 which is detachably secured thereto by means of longitudinal flanges 23 which engage frictionally with the sides of the horn. The cover preferably terminates at the outer end a short distance from the outer end of the top plate 17, which plate is extended slightly beyond the end of the horn as shown at 24, to provide a tearing edge for the tape. The inner end of the cover 22 is turned or bent upwardly to provide a stop or ledge 25 which prevents water or moisture passing from the casings to the incoming tape and also serves as a handle. The cover is held against longitudinal movement by a projection 26 on the top 17 which engages with a notch 27 in one of the sides 23 of the cover.

A clamp 28 engages with the horn 15 between the end of the cover 22 and the coupling 18 as shown in Figure 2, and is held in adjusted position by a screw 29 and nut 30. Arms 31 extend upwardly from the clamp and are preferably directed forwardly to provide clearance for the operation of the valve lever 13. These arms are provided with slots 32 for receiving the shaft 33 of a spool or roller 34 which carries the roll of tape, ribbon or other marking material 35. Such marking or identification strip may be made of any suitable material for the purposes intended, as set forth in my patent and prior applications, such for instance as cord or string, paper, woven material, fabric, cellulose material, or the like. A pin 36 extends between the arms 31 adjacent to the clamp and another pin 37 is provided at a short distance above the same. The tape 35 is passed from the roll under the pin 37 and back of the pin 36 and then down and through the passageway or guideway 38 at the top of the horn. The cover 22 is preferably removed for drawing the tape through such passageway and then fastened in position for operation.

When the apparatus is to be used, as for stuffing sausage, cheese, or other food products, the roll of tape is mounted and arranged as described with the outer end extending over the end of the horn a short distance so that it will be engaged by the filling material. When a casing such as shown at 39 is to be stuffed, one end is tied in the usual manner and the casing slipped over the horn as shown in Figure 1. The operator then holds or guides the casing by one hand and manipulates the valve lever 13 with the other hand. When the valve is opened the sausage or other filling material passes out through the horn and presses the projecting end of the tape against the inner end of the casing and upwardly against the inner upper surface thereof. As the filling continues the casing is gradually pushed off from the horn and the incoming strip of tape or insert is pressed between the filling material and the inner wall of the casing, which action occurs until the end of the casing is reached. Thereupon the operator shuts the valve and pinches the open end of the casing and usually hands it to the tier to be tied at such end. The tape is simultaneously broken off with the other hand by pinching it or tearing it over the edge 24. The projecting end of the tape is then pushed into position for the next operation and this is continued with practically no loss of time incident to the insertion of the identifying strip in the casing. It will of course be understood that the tape is inserted in such manner that the printing or other identifying indicia thereon will be uppermost or so that it is readable through the transparent or semitransparent casing, such as the artificial or natural casings commonly used for sausage or other food products.

In the stuffing devices shown in my prior applications the passageways for the identifying means were in the nature of auxiliary horns or attachments to be used in connection with the usual forms of stuffer horns. While such devices were successful in operation, it will be readily seen that my present device provides a unitary structure for the passage of the filler and the identifying means and may be coupled directly to the stuffing machine, thus eliminating a number of parts, which is highly desirable, as these devices should be kept scrupulously clean and sterilized from time to time. Furthermore the operation is expedited, as the horn supplies a desirable capacity for the passage of the food product therethrough and the air may readily escape from the casing through the passageway during the filling of the casing.

While I have shown a preferred form of my device, it will be noted that changes may be made in the construction in order to adapt the same for different conditions or different materials, or for simplifying the manufacture of the same and therefore I do not wish to be limited to the particular form shown and described except as specified in the following claims, in which I claim:

1. A device of the character set forth, comprising stuffing means for injecting material into casings, having a covered, unitary passageway formed therewith for the passage of identifying means into the casings.

2. A stuffer horn having a unitary, closed passageway coacting therewith for the passage of identifying means for the purposes described said closed passageway serving to protect the identifying means and to keep the same dry while passing therethrough.

3. A new article of manufacture comprising a stuffer horn having an exterior channel for the passage of identifying means and a cover for covering said passageway to protect the identifying means and keep the same dry while passing through said channel.

4. A stuffer horn of substantially U-shape in cross section having a flat longitudinal portion and a cover coacting with said flat portion to provide a passageway along the horn.

5. A horn for the purposes set forth having a flat longitudinal surface with ledges projecting beyond the same, and a cover detachably connected with said ledges to provide a longitudinal passageway.

6. A stuffer horn having a substantially U-shaped body portion and a flat top portion positioned within the edges of the side portions, and a cover engaging with the side portions to provide a longitudinal covered passageway along the horn.

7. The combination with a stuffer horn having a longitudinal passageway for the passage of identifying strips, of a bracket engaging with the horn adjacent to the coupling end and having upwardly extending arms, and means engaging with the arms for supporting a roll of material for the identifying strips.

8. The combination with a stuffing machine having an outlet orifice and a valve for controlling the same, of a horn adapted to be coupled to the outlet, and provided with a longitudinal passageway for the passage of identifying means therethrough, a bracket projecting from the rear portion of the horn outwardly at an angle of less than ninety degrees to the horn, and means carried by the bracket for supporting a roll of identifying tape, the arrangement being such that the roll will not interfere with the operation of said lever.

9. The combination with a stuffer horn having a unitary passageway longitudinally thereof, of a cover for said passageway, a clamp engaging with the horn, a bracket carried by said clamp, and a roll in the bracket for supporting a marking strip.

10. An apparatus of the character set forth, comprising a stuffer horn, a unitary guideway extending longitudinally thereof, said horn and guideway serving to hold a casing preparatory to stuffing the same, and means for supporting a strip adjacent to the guideway whereby the strip may be passed from the support through said guideway to be fed out with the casing and stuffing material.

11. In a device for the purposes set forth, the combination of a stuffer horn having tape or ribbon guide means formed integrally therewith, said horn having a flat wall forming a part of the guide means and extending beyond the end of the horn to provide a tearing edge, a bracket carried by said horn, means carried by the bracket for supporting the roll of tape or the like, and guides on the bracket, the arrangement being such that the tape may be directed from said roll around the guides and through the guide means to be interposed between the casing and the filling, as described.

ALPHEUS J. FREEMAN.